US006407936B1

(12) United States Patent
Tang (10) Patent No.: US 6,407,936 B1
(45) Date of Patent: Jun. 18, 2002

(54) CAPACITIVE BOOST FOR LINE HARMONIC IMPROVEMENT IN POWER CONVERTERS

(75) Inventor: Allen P. C. Tang, Hong Kong (HK)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/805,823

(22) Filed: Mar. 13, 2001

(51) Int. Cl.⁷ .............................................. H02M 1/14
(52) U.S. Cl. ...................... 363/44; 363/126; 363/143
(58) Field of Search ............................. 363/44, 47, 48, 363/126, 142, 143

(56) References Cited

U.S. PATENT DOCUMENTS

| 4,268,899 A | * | 5/1981 | Rokas | 363/61 |
| 5,119,283 A | * | 6/1992 | Steigerwald et al. | 363/143 |
| 5,287,263 A | * | 2/1994 | Shilo | 363/143 |
| 5,383,109 A | * | 1/1995 | Maksimovic et al. | 363/143 |
| 5,661,348 A | * | 8/1997 | Brown | 363/126 |
| 5,831,846 A | * | 11/1998 | Jiang | 363/143 |
| 5,933,336 A | * | 8/1999 | Jiang et al. | 363/44 |
| 6,018,221 A | * | 1/2000 | Ohtake | 363/47 |
| 6,031,739 A | * | 2/2000 | He et al. | 363/44 |
| 6,137,700 A | * | 10/2000 | Iida et al. | 363/143 |
| 6,239,995 B1 | * | 5/2001 | Weng et al. | 363/44 |

* cited by examiner

Primary Examiner—Jeffrey Sterrett
(74) Attorney, Agent, or Firm—Coudert Brothers LLP (57) ABSTRACT

AC line harmonics are reduced in an AC-powered DC power supply by providing a boost circuit which, during the positive half-cycle of the AC input, adds the charge of a boost capacitor to the AC input voltage so as to initiate current flow through the harmonic suppression inductor before the AC input voltage rises to the level of the bulk capacitance charge. The boost capacitor is charged from a separate voltage source during the negative half-cycle of the AC input, which also provides early current flow from the neutral.

7 Claims, 7 Drawing Sheets

CAPACITIVE BOOST FOR LINE HARMONIC IMPROVEMENT IN POWER CONVERTERS

FIELD OF INVENTION

This invention relates to inductive line harmonic suppression in power converters with AC Input, and more particularly to a capacitive boost circuit that allows the use of smaller inductors by providing an earlier onset of conduction during positive and negative half-cycles of the AC supply.

BACKGROUND OF THE INVENTION

Regulations EN 61000 and IEC 1000 require line harmonic current control in Electrical equipments. The typical way of complying with this requirement is to add an inductor in the input line to enlarge the conduction angle of the AC line current. The amount of line harmonic current (LHC) suppression depends on the inductance value. The major disadvantage is that, firstly, the inductor copper loss is high. Secondly, the input capacitor is not fully charged up to the input peak voltage because of the delay of the charge current when the corner frequency formed by the inductor and the bulk capacitor is below the line input frequency. This means that a bigger bulk capacitor is required to meet the typical hold-up time requirement.

Conventional active power factor control (PFC) circuits can reduce the LHC effectively, but both the part count and cost are high. A simple version of single stage PFC solution is a simple and good solution, but it is only practical for a lower power application. It is limited to a wide-range design, and an expensive bulk capacitor is required to provide the required hold-up time. The dual input range PFC requires an additional power switch and a complicated coupled power transformer. And thus it is also more expensive.

It is therefore desirable to find a way to reduce the size of the harmonic suppression inductors and the bulk capacitors in an AC-to-DC power converter without adversely affecting the LHC suppression capabilities of the circuit.

SUMMARY OF THE INVENTION

The present invention enhances the harmonic suppression action of the AC line inductor by providing a capacitive boost circuit which stores energy on the negative half cycle of the AC supply and subsequently releases it at the beginning of the positive half cycle so as to initiate the current flow through the line inductor earlier than the unaided bulk capacitor(s) would permit.

Broadly stated, the present invention comprises a line harmonic control circuit for a power supply circuit having an AC input across a line and a neutral, a bridge rectifier connected to said AC input for full-wave rectifying said AC input, an inductor connected between said AC input and said bridge rectifier, and a bulk capacitance connected to the output of said bridge rectifier for providing a substantially level DC output across a positive terminal and a negative terminal, comprising: a DC voltage source, a first diode and a second diode connected in series between said positive and negative terminals; and a boost capacitor connected between the junction of said first and second diodes and said line, wherein said first and second diodes are of a polarity to allow current flow from said voltage source toward said positive terminal, and wherein the positive side of said voltage source is the side connected to said first diode.

DESCRIPTION OF THE PREFERRED EMBODIMENTS

Figure 1:
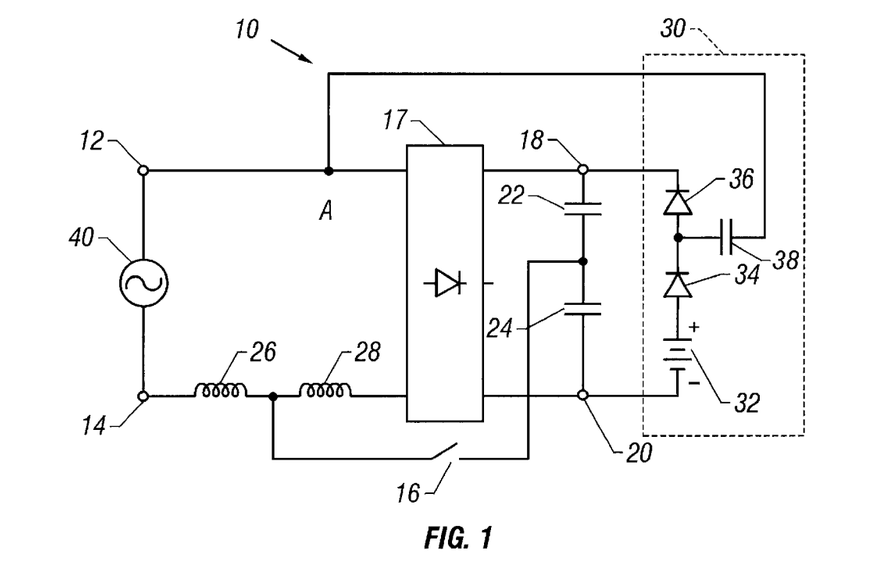
FIG. 1 is a circuit diagram of a dual voltage range power converter circuit according to the present invention.

FIG. 1 is a circuit diagram of a dual-input-range AC-to-DC converter 10 for a power supply such as a personal computer (PC) power supply, using a single-inductor full-wave rectification topology with voltage-doubling mode operation at low range input. A typical AC supply 40 across line 12 and neutral 14 may be 230V AC (high range, voltage select switch 16 open) or 115V AC (low range, voltage select switch 16 closed). The typical output of the rectifier bridge 17 across converter output terminals 18 and 20 is $230 \times \sqrt{2}$V DC.

With the voltage select switch 16 open, bulk capacitors 22, 24 are each charged to one-half the DC output across terminals 18, 20. The bridge 17 draws the charging current for the bulk capacitors 22, 24 through inductors 26, 28 in series. With the voltage select switch 16 closed, capacitor 22 charges to substantially the line voltage on the positive half-cycle of the AC supply, while capacitor 24 does the same on the negative half-cycle. Because the capacitors 22, 24 are in series in the output circuit, this arrangement produces a voltage doubling effect at the outputs 18, 20. Only inductor 26 is in the circuit in the voltage doubler mode.

Figure 5:
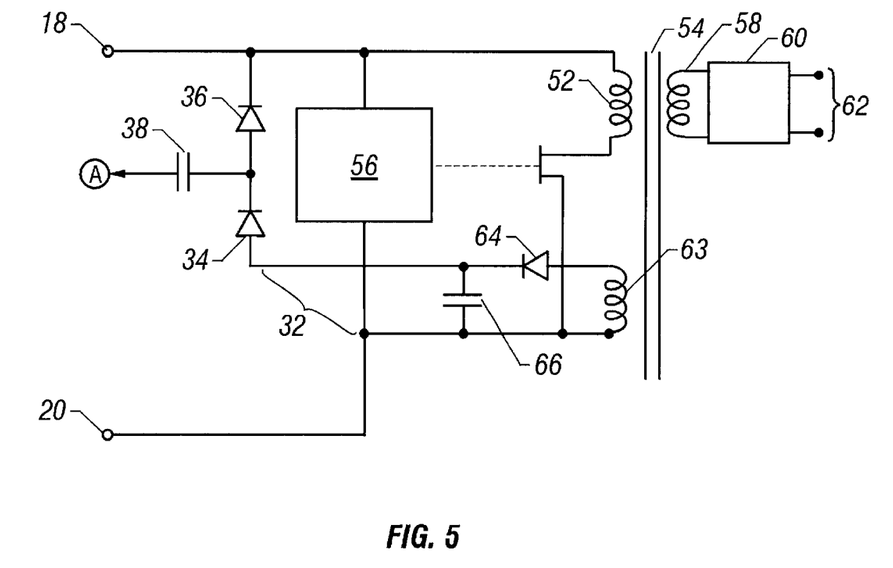
FIG. 5 is a circuit diagram similar to FIG. 1 but showing an alternative embodiment of the present invention.

In accordance with the present invention, a boost circuit 30 is added to the conventional converter circuit described above. The boost circuit 30 includes a voltage source 32 which may be a battery, a DC voltage derived, as shown in FIG. 5, from an auxiliary winding of the isolation transformer of a flyback converter-type power supply, or any other suitable voltage source. The voltage source 32 is connected in series with a pair of diodes 34, 36 across the converter output terminals 18, 20. A boost capacitor 38 is connected from the junction of the diodes 34, 36 to the line side 12 of the AC input before the bridge 17.

The operation of the circuit 30 is as follows: Due to the action of the rectifier bridge 17, terminal 18 is always high and terminal 20 is always low. During the positive half-cycle of the AC input, line 12 is high and line 14 is low, while during the negative half-cycle, line 14 is high and line 12 is low.

Figure 2A:
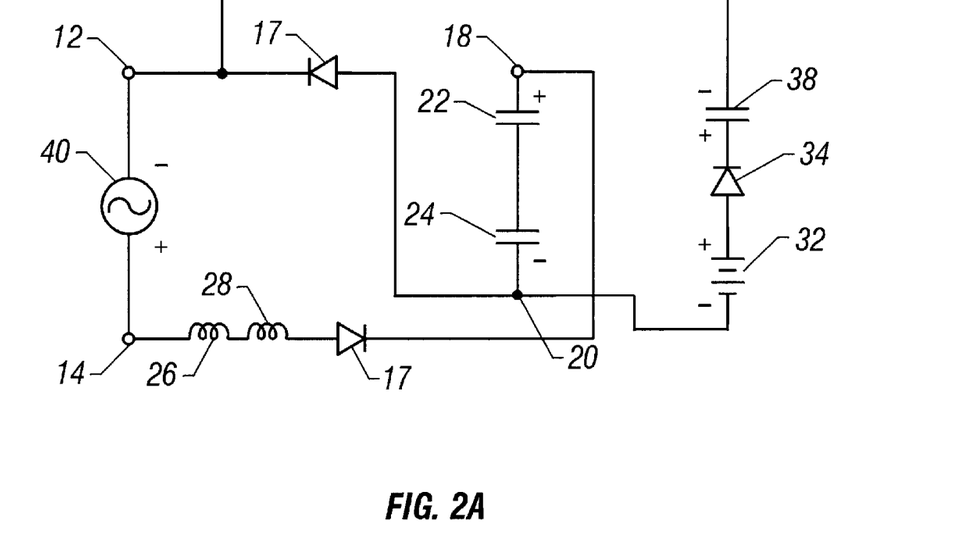
FIG. 2a is a circuit diagram showing the equivalent circuit of the circuit of FIG. 1 during the negative half-cycle of the AC supply at high range.

The action of the blocking diodes 34, 36 and the open voltage select switch 16 allows the equivalent circuit during the negative half-cycle of the AC supply at high range to be depicted as in FIG. 2*a*. Before the bulk capacitors 22, 24 charge in the conventional manner from AC source 40 through rectifier bridge 17 and inductors 26, 28, a charging circuit is established from the voltage source 32 through diode 34, capacitor 38, line 12, AC source 40, inductors 26, 28, bridge diode 17, and bulk capacitors 27, 24 back to voltage source 32. The voltage of voltage source 32 is $V_{VS}$, capacitor 38 will charge to about $V_{VS}$. The initial charging circuit is taken place when the absolute value of an input voltage is Vvs lower than the bulk voltage.

Figure 2B:
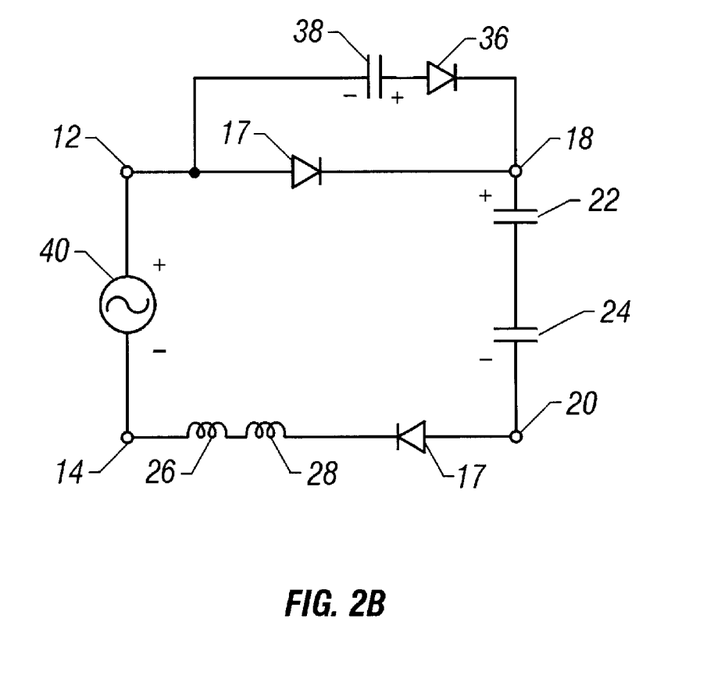
FIG. 2b is a circuit diagram showing the equivalent circuit of the circuit of FIG. 1 during the positive half-cycle of the AC supply at high range.

During the positive half-cycle of AC source 40, the equivalent circuit is as shown in FIG. 2*b*. In the absence of capacitor 38 and diode 36, current cannot flow through the circuit until the voltage $V_{AC}$ of the AC supply 40 exceeds the voltage of the bulk capacitors 22, 24. In order to enhance the harmonic suppression action of the inductors 26, 28, it is however desirable to start current flow through the inductors 26, 28 at an earlier time. The inventive circuit accomplishes that because capacitor 38, whose voltage is $V_{VS}$ creates an early current flow through diode 36, bulk capacitors 22, 24, bridge diode 17, inductors 26, 28 and AC source 40 at lower input voltage. Thus, current flow through the inductors 26, 28 does not have to await the rise of the AC supply voltage to the DC level of output terminals 18,20. Capacitor 38 is discharged to zero voltage, and the energy is capacitor C38 is transferred to the bulk capacitors.

The negative charging cycle repeats when the Neutral voltage is $V_{VS}$ lower than the bulk voltage. The maximum bulk voltage is about $V_{VS}$ higher than without the additional circuit at no load condition, when the energy transferred from capacitor 38 cannot be discharged.

Figure 2C:
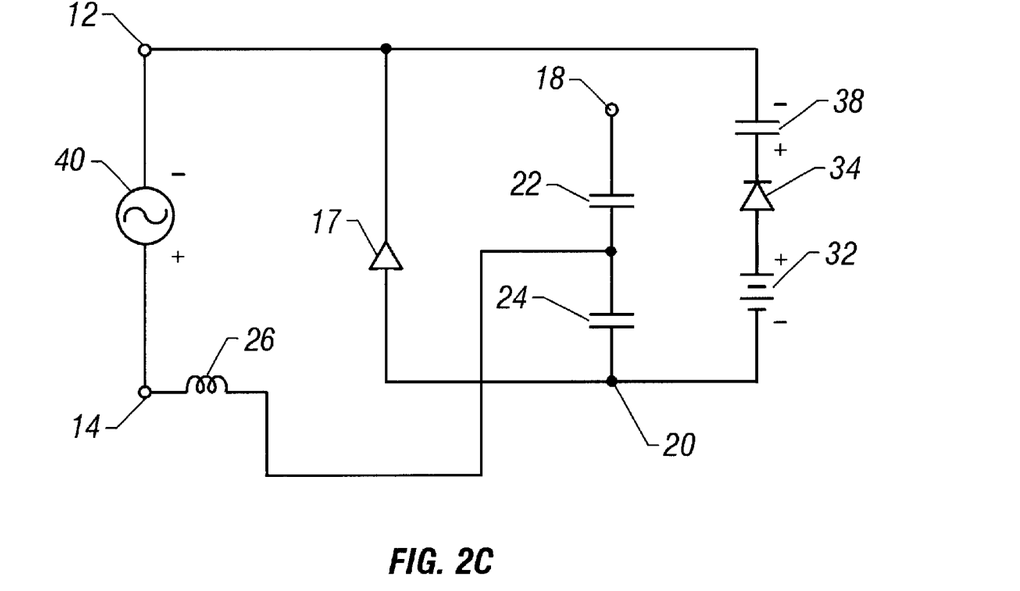
FIG. 2c is a circuit diagram showing the equivalent circuit of the circuit of FIG. 1 during the negative half-cycle of the AC supply at low range.

The action of the inventive circuit is similar at low range. With the voltage select switch 16 closed, the equivalent circuit during the negative half-cycle of the AC input is as shown in FIG. 2*c*. Boost capacitor 38 charges through line 12, the AC source 40, neutral 14, inductor 26, voltage source 32 and diode 34. After capacitor 38 is fully charged to Vvs, bulk capacitor 24 charges through bridge diode 17, line 12, AC source 40, neutral 14 and inductor 26. Bulk capacitor 22 does not charge at this time.

Figure 2D:
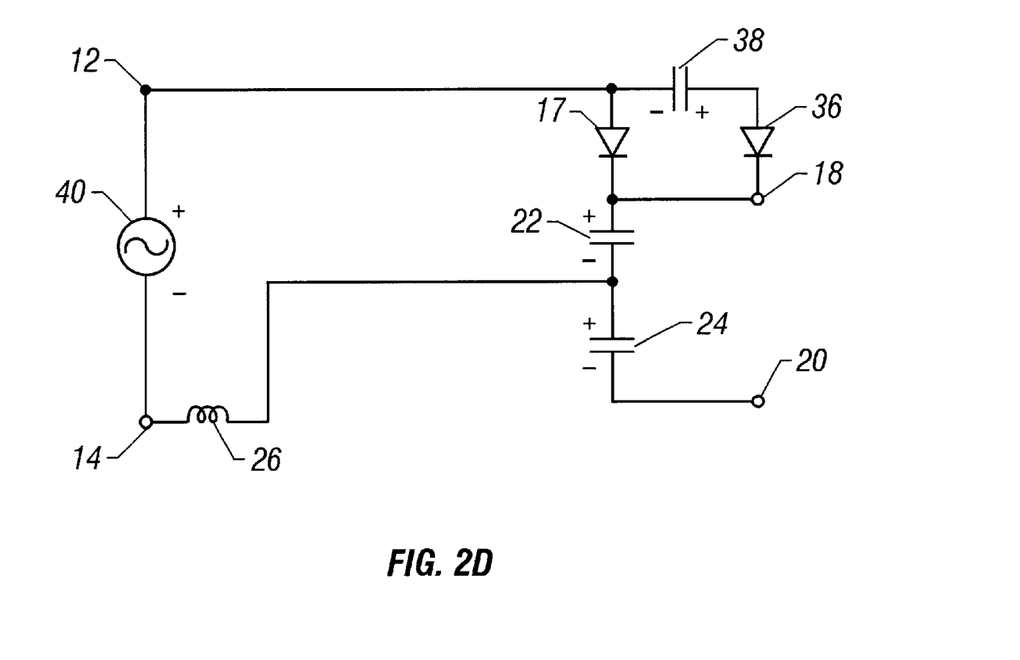
FIG. 2d is a circuit diagram showing the equivalent circuit of the circuit of FIG. 1 during the positive half-cycle of the AC supply at low range.

The equivalent circuit of FIG. 2*d* shows the conditions during the positive half-cycle of the AC input at low range. As soon as the voltage of the AC input 40 exceeds the voltage on bulk capacitor 22, bridge rectifier diode 17 becomes forward-biased, and bulk capacitor 22 charges through inductor 26, neutral 14, AC source 40, line 12 and diode 17. However, even before the charging of bulk capacitor 22 begins, current flow is established by the discharge of boost capacitor 38 to zero through diode 36, bulk capacitor 22, inductor 26, neutral 14, AC source 40 and line 12. The early current flow through inductor 26 once again reduces the AC line harmonics. Note that at no load condition, the bulk voltage will be 2 times of Vvs higher than without the additional circuit.

Figure 3A:
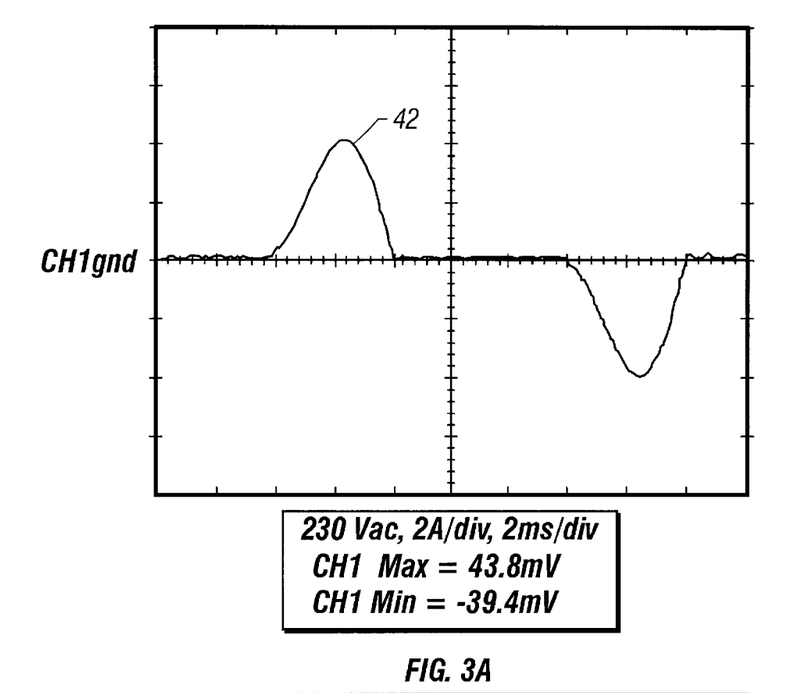
FIG. 3a is a time-amplitude diagram illustrating the AC input waveform of the circuit of FIG. 1 at 230V.
Figure 3B:
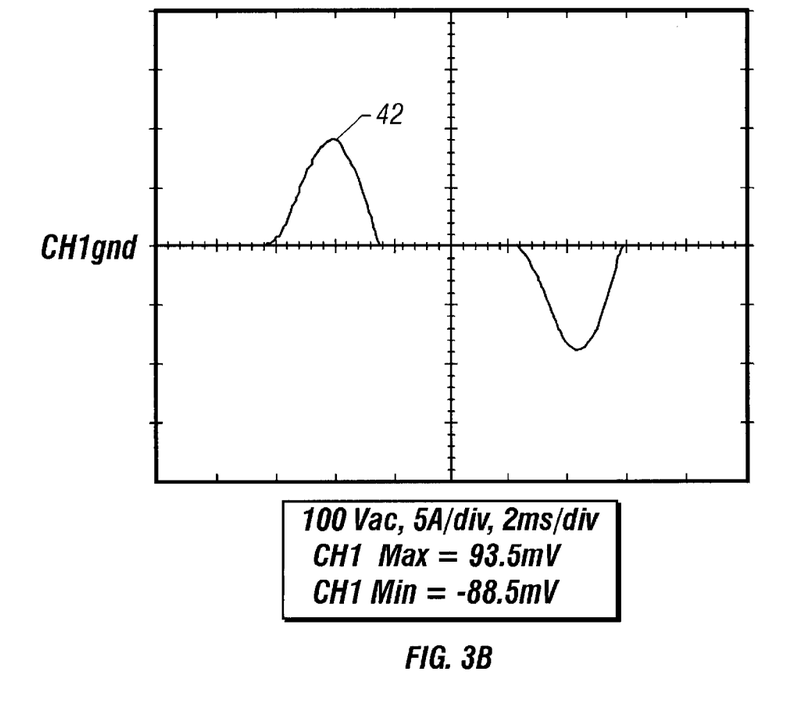
FIG. 3b is a time-amplitude diagram illustrating the input waveform at 100V.

FIGS. 3*a* and 3*b* show the input current waveform 42 at high range and low range, respectively. It will be noted in both instances that current does not flow as long as the AC voltage (in either direction) is lower than the bulk capacitor voltage minus the voltage Vvs.

Figure 4A:
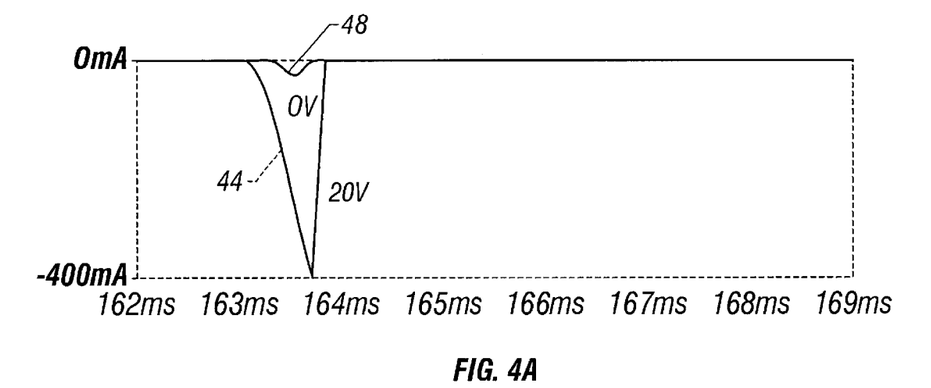
FIG. 4a is a time-amplitude diagram showing the charging current through the boost capacitor with and without the auxiliary voltage source.
Figure 4B:
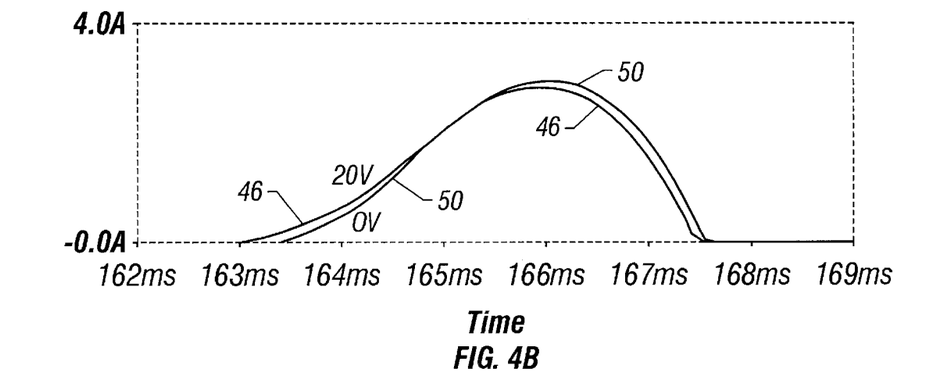
FIG. 4b is a time-amplitude diagram showing the AC input current waveforms with and without the auxiliary voltage source.

FIGS. 4*a* and 4*b* compare the inventive circuit using a 20V DC voltage source 32 (curves 44 and 46) to the inventive circuit using no DC voltage source (curves 48 and 50). The latter corresponds, in effect, to the inventive harmonic reduction circuit being disabled. FIG. 4*a* shows the discharge current waveform through boost capacitor 38. FIG. 4*b* shows that the input waveform 46 begins about 0.5 ms earlier and peaks at a slightly lesser value than the input waveform 50 in the absence of the DC voltage source 32. Although increasing the voltage of the DC voltage source 32 will theoretically widen the conduction angle, such an increase will also increase the ripple current through boost capacitor 38. The expense of a high ripple current capacitor for boost capacitor 38 is therefore in practice a limiting factor for the increase of the DC voltage source 32.

FIG. 5 illustrates an alternative embodiment of the present invention suitable for use in a power converter using an isolation transformer, as for example in a flyback converter. In FIG. 5, the positive terminal 18 and the negative terminal 20 (see FIG. 1 for the circuit portion connected to the left of terminals 18 and 20) constitute the input to the primary 52 of an isolation transformer 54 that is pulsed by a control circuit 56. The pulsing produces an AC output in a secondary winding 58 which is then rectified at 60 and applied to a load 62. The transformer 54 in FIG. 5 may have an auxiliary winding 63 whose output is rectified by diode 64 and capacitor 66 for use as the DC voltage source 32. This dispenses with the need for a battery.

Figure 6:
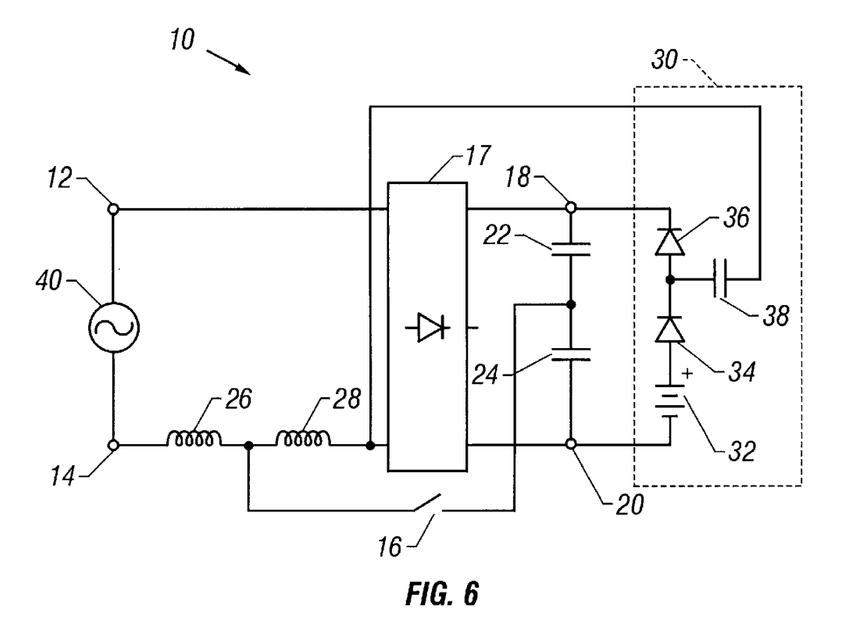
FIG. 6 is a circuit diagram similar to FIG. 1, but showing another alternative embodiment of the present invention.

A second embodiment of the present invention is shown in FIG. 6. This embodiment differs from that of FIG. 1 only in that the left side of capacitor 38 is connected to a point between inductor 28 and the bridge 17, instead of being connected to the line 12. The advantage of the FIG. 6 circuit is that it bypasses the boost function when the voltage select switch 16 is closed at low range operation, so that the bulk capacitors 22, 24 can have a lower voltage rating, i.e. only the AC peak voltage rating. This contrasts with the circuit of FIG. 1, in which the bulk capacitors 22, 24 must be rated for AC peak voltage plus twice the voltage of the voltage source 32 for low range operation.

The boost circuit 30 is not necessary in practice at low range, because the inductance required for low range operation is much lower than the inductance required for high range operation. This is so for three reasons: first, the voltage across the inductors 26, 28 at low range is half that at high range, and therefore the inductance can be half as much for the same effect; secondly, the harmonic current limit is inversely proportional to the input voltage, and therefore the required inductance is again half as much; and thirdly, the line frequency of the standard U.S. 115 V AC low range power is 60 Hz, as opposed to the 50 Hz frequency of the standard European 230 V AC high range power. This allows a higher di/dt at low range, which further reduces the needed inductance by a factor of 1.2. Consequently, the low-range inductance need only be about one-fifth of the high range inductance.

Disabling the boost circuit at low range allows the use of a higher voltage source 32 at high range, where a high voltage source 32 is beneficial in reducing the need for a high inductance and providing better harmonic reduction. On the other hand, a high voltage source 32 is detrimental at low range where the boost is not needed, because it increases the voltage rating needed for the bulk capacitors 22, 24. Thus the optimum operation is achieved by increasing the voltage source 32 and the high-range inductance, and disabling the boost circuit 30 at low range.

The way in which the circuit of FIG. 6 achieves this result is illustrated in FIGS. 7a–d. During the positive half-cycle of the high-range AC supply (FIG. 7a), the boost capacitor 38 charges through connection 70, inductors 28, 26, the AC source, line 12, the bridge 17, bulk capacitors 22, 24, the voltage source 32, and diode 34. During the negative half-cycle of the high-range AC supply (FIG. 7b), boost capacitor 38 discharges through diode 36, bulk capacitors 22, 24, the bridge 17, line 12, the AC supply, inductors 26, 28, and line 70. This produces an earlier current flow through the inductors 26, 28 in the same manner as in the circuit of FIG. 1.

Figure 7A:
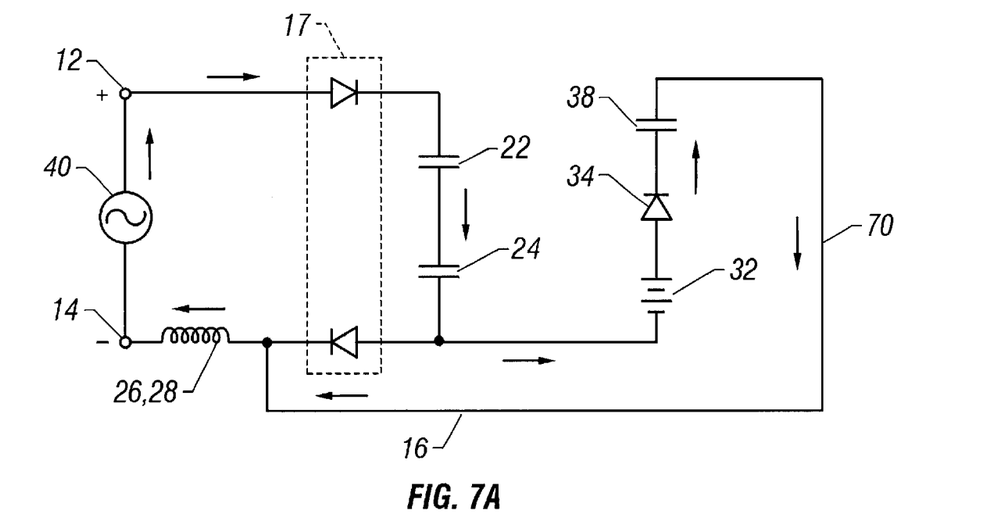
FIGS. 7a–d are equivalent circuit diagrams like FIGS. 2a–d but relating to the embodiment of FIG. 6.
Figure 7B:
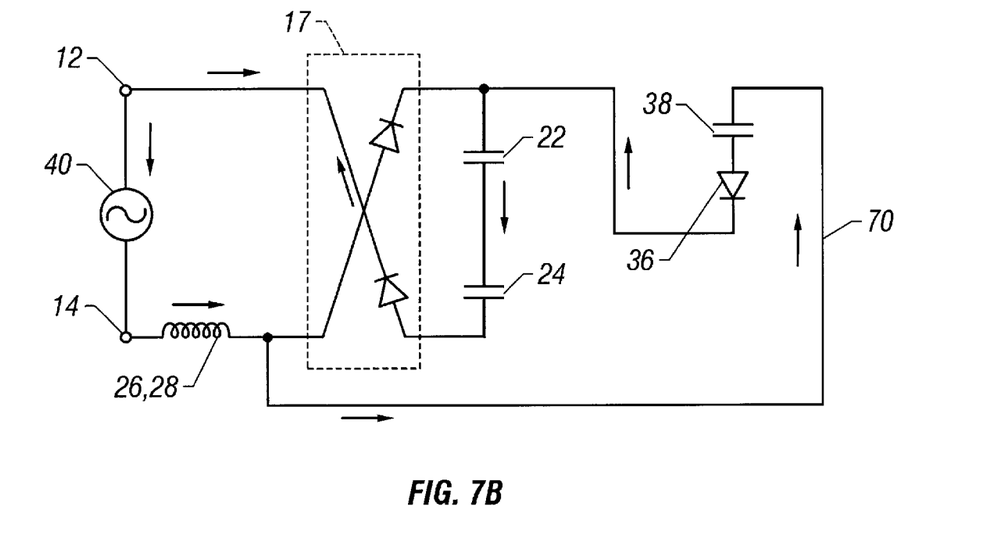
Figure 7C:
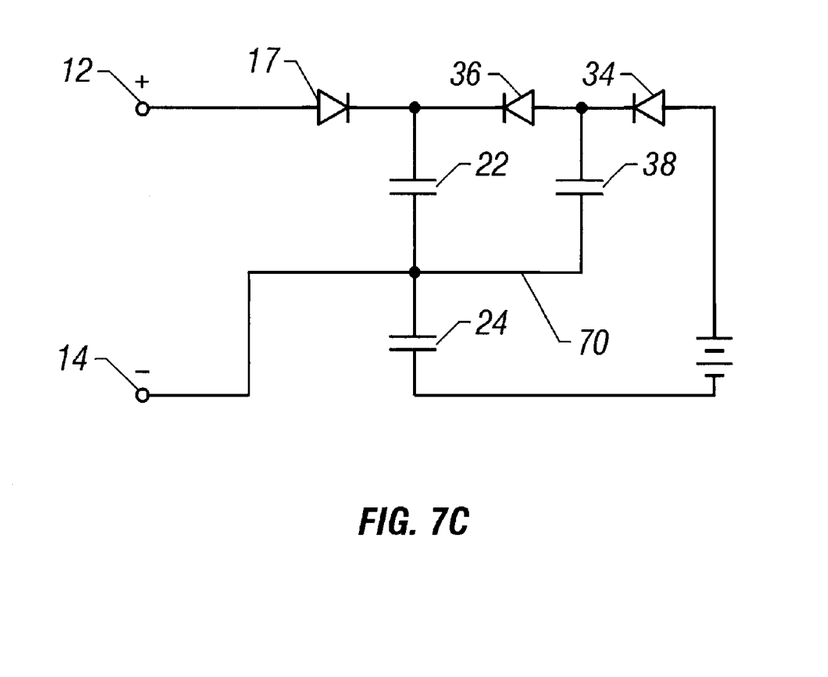
Figure 7D:
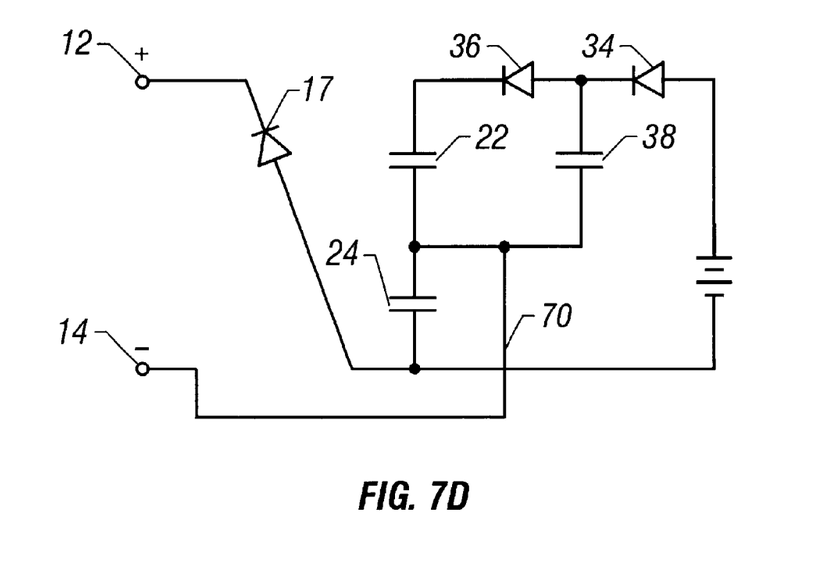

With the range switch 16 closed for low range operation, the equivalent circuit (with the inductors omitted for clarity) during the positive half-cycle is shown in FIG. 7c. During that half-cycle, (FIG. 7c), diode 36 is back-biased by line 12, and diode 34 is back-biased by bulk capacitor 24, so that no current can flow through boost capacitor 38. During the negative half-cycle (FIG. 7d), diode 34 is back-biased by line 14, and diode 36 back-biased by bulk capacitor 22. Consequently, again no current flows through boost capacitor 38, and the boost function is disabled.

What is claimed is:

1. A line harmonic control circuit for a power supply circuit having an AC input across a line and a neutral, a bridge rectifier connected to said AC input for full-wave rectifying said AC input, an inductor connected between said AC input and said bridge rectifier, and a bulk capacitance connected to the output of said bridge rectifier for providing a substantially level DC output across a positive terminal and a negative terminal, comprising:

a DC voltage source, a first diode and a second diode connected in series between said positive and negative terminals; and a boost capacitor connected between the junction of said first and second diodes and said line; wherein said first and second diodes are of a polarity to allow current flow from said voltage source toward said positive terminal, and wherein the positive side of said voltage source is the side connected to said first diode.

2. The control circuit of claim 1, in which said bulk capacitance includes a first capacitor and a second capacitor connected in series, and said power supply circuit further includes a voltage selector switch connected between a point intermediate said inductor and said bridge rectifier and a point intermediate said first and second bulk capacitors.

3. The control circuit of claim 1, in which said DC voltage source is a battery.

4. The control circuit of claim 1, in which said power supply circuit is part of a power converter having an isolation transformer, and said DC voltage source is derived from an auxiliary winding on said isolation transformer.

5. A method of reducing line harmonics in a power supply circuit having an AC input across a line and a neutral, a bridge rectifier connected to said AC input for full-wave rectifying said AC input, an inductor connected between said AC input and said bridge rectifier, and a bulk capacitance connected to the output of said bridge rectifier for providing a substantially level DC output across a positive terminal and a negative terminal, comprising the steps of:

a) providing a boost capacitor;

b) charging said boost capacitor to a predetermined voltage during the negative half-cycle of the AC input; and c) so connecting said boost capacitor into said circuit during the positive half cycle of the AC input as to reduce the voltage the AC input must reach before driving current through said inductor.

6. The method of claim 5, further comprising the step of using diodes to so connect said boost capacitor into the charging circuit of said bulk capacitance as to add the charge of said boost capacitor to the voltage of said AC input during the positive half-cycle of said AC input.

7. A line harmonic control circuit for a power supply circuit having an AC input across a line and a neutral, a bridge rectifier connected to said AC input for full-wave rectifying said AC input, an inductor connected between said AC input and said bridge rectifier, and a bulk capacitance connected to the output of said bridge rectifier for providing a substantially level DC output across a positive terminal and a negative terminal, comprising:

a DC voltage source, a first diode and a second diode connected in series between said positive and negative terminals; and a boost capacitor connected between the junction of said first and second diodes and a point between said neutral and said bridge rectifier; wherein said first and second diodes are of a polarity to allow current flow from said voltage source toward said positive terminal, and wherein the positive side of said voltage source is the side connected to said first diode.

* * * * *